United States Patent [19]
Summerville et al.

[11] Patent Number: 5,280,431
[45] Date of Patent: Jan. 18, 1994

[54] METHOD FOR CONTROLLING THE MOVEMENTS OF A MOBILE ROBOT IN A MULTIPLE NODE FACTORY

[75] Inventors: David F. Summerville, Garland; John P. Williston; Martin A. Wand, both of Plano; Thomas J. Doty, Dallas; Haradon J. Rice, Plano, all of Tex.

[73] Assignee: Texas Instruments Incorporated, Dallas, Tex.

[21] Appl. No.: 265,207

[22] Filed: Oct. 31, 1988

Related U.S. Application Data

[60] Continuation-in-part of Ser. No. 129,914, Dec. 4, 1987, Pat. No. 4,887,013, which is a division of Ser. No. 771,379, Aug. 30, 1985, abandoned.

[51] Int. Cl.$^5$ .................... G06F 15/50; G05D 1/02
[52] U.S. Cl. .................... 364/424.02; 364/444; 364/461; 395/90; 180/168
[58] Field of Search .................... 364/424.02, 444, 460, 364/461; 180/168, 169; 395/905, 80, 90

[56] References Cited

U.S. PATENT DOCUMENTS

| | | | |
|---|---|---|---|
| 4,653,002 | 3/1987 | Barry | 364/424.02 |
| 4,674,048 | 6/1987 | Okumura | 364/424.02 |
| 4,817,000 | 3/1989 | Eberhart | 364/424.02 |
| 4,821,192 | 4/1989 | Taivalkoski et al. | 364/424.02 |
| 4,926,343 | 5/1990 | Tsuruta et al. | 364/513 |

FOREIGN PATENT DOCUMENTS

| | | | |
|---|---|---|---|
| 0213939 | 8/1986 | European Pat. Off. | G05D 1/03 |
| 0182712 | 7/1988 | Japan | 364/424.02 |
| WO88/04081 | 6/1988 | World Int. Prop. O. | G06F 15/50 |

OTHER PUBLICATIONS

Patent Disclosure document–Koji Anzai, System For Controlling Carrier Truck Appln. No. 60–72100 Int Class G05D1.02 Date: May 4, 1985.

Primary Examiner—Vincent N. Trans
Attorney, Agent, or Firm—Richard L. Donaldson; Wade James Brady; Frederick J. Telecky

[57] ABSTRACT

The invention provides a method for communicating the need to move a mobile robot, such as an AGV, from one location (node) to another, on a node-by-node basis, incrementally, among the nodes established in a physical environment such as a factory. The invention also provides the means to generate the commands necessary to accomplish this motion, by providing specific steering and drive information such as angle and speed to the mobile robot or AGV. The invention accomplishes these tasks in response to direct commands from a stationary controller as well as in response to continuous node-by-node position updates provided by an external navigation system, such as a visual navigation system, or an internal dead-reckoning navigation system, or both.

10 Claims, 6 Drawing Sheets

METHOD FOR CONTROLLING THE MOVEMENTS OF A MOBILE ROBOT IN A MULTIPLE NODE FACTORY

This patent application is a continuation-in-part of U.S. patent application Ser. No. 129,914 filed on Dec. 4, 1987, now U.S. Pat. No. 4,887,013 which is a divisional of U.S. patent application Ser. No. 771,379 filed on Aug. 30, 1985, now abandoned which is incorporated by reference hereby.

RELATED U.S. PATENT APPLICATIONS

This invention is related to the following U.S. patent applications, assigned to Texas Instruments Incorporated which by reference are incorporated herein:

| File | Serial No. | Status | Patent No. | Issue Date |
| --- | --- | --- | --- | --- |
| TI10942 | 771,397 | Issued | 4,779,203 | 10/18/88 |
| TI11016 | 771,433 | Issued | 4,706,1120 | 11/10/87 |
| TI11073 | 772,061 | Abandoned | | |
| TI11074 | 771,380 | Issued | 4,789,940 | 12/6/88 |
| TI11091 | 771,432 | Issued | 4,754,402 | 6/28/88 |
| TI11092 | 771,431 | Abandoned | | |
| TI11093 | 772,280 | Abandoned | | |
| TI9749 | 771,442 | Abandoned | | |
| TI11094 | 771,443 | Issued | 4,745,551 | 5/17/88 |
| TI11096 | 771,322 | Abandoned | | |
| TI11097 | 771,379 | Abandoned | | |
| TI11098 | 771,329 | Abandoned | | |
| TI11107 | 771,459 | Issued | 4,750,123 | 6/7/88 |
| TI11441 | 771,545 | Issued | 4,959,802 | 9/5/90 |
| TI1107A | 222,322 | Issued | 4,887,223 | 12/12/89 |
| TI11096A | 195,345 | Issued | 4,882,694 | 11/21/89 |
| TI11097.1 | 129,914 | Issued | 4,887,013 | 12/12/89 |
| TI1296 | 909,737 | Abandoned | | |
| TI1296A | 191,834 | Abandoned | | |
| TI11104 | 265,206 | Allowed | | |
| TI11110 | 265,070 | Issued | 4,926,103 | 5/15/90 |
| TI11112 | 265,068 | Abandoned | | |
| TI11113 | 265,207 | Allowed | | |
| TI12757 | 265,196 | Issued | 4,940,925 | 7/10/90 |

BACKGROUND OF THE INVENTION

1. Field of the Invention

This invention relates to guidance and control methods for automatically guided vehicle (AGV) systems such as mobile robots and more specifically to methods for directing an AGV to move at a specific speed and angle (from one fixed location to another), to methods which allow two or more AGVs to cross paths without conflict, to methods which provide on-board control of an AGV's steering and drive mechanisms, and to methods for checking, coordinating, and communicating differences between the AGV's absolute position and its calculated position.

2. Description of the Related Art

Conventional automatically guided vehicles such as those used to move materials in warehouses and factories provide minimal point-to-point movement control. Most such systems involve AGVs which follow a fixed guide track, usually either a radio transmitter antenna wire buried in the factory floor, a reflective stripe painted on the floor, or a reflective tape glued to the floor. Such methods are described in U.S. Pat. Nos. 45,300,056, 4,554,724, 4,562,653, 4,593,238, and 4,593,239. All of these schemes purposely limit the individual AGV's freedom of movement by constraining the AGVs to follow a physically fixed path.

Most such systems rely on on-vehicle proximity detection, such as active bumpers or ultrasonic sensors, to deal with collisions with other AGVs, stationary objects, or personnel. In such systems, the AGVs also may move only one direction along the track.

Systems such as those described in the related Texas Instruments applications achieve true point-to-point movement by implementing control schemes which allow multiple AGVs to coexist in the same pathways without collision or excessive queuing and by using free-roving AGVs having programmable bi-directional paths. These new methods maximize the degrees of freedom of AGV movement. The control scheme set forward in TI-11104, co-pending, implements a scheme of "static" collision avoidance for AGV systems. Essentially, that method uses a rule-based computer program to examine the "mapped environment" set forward in TI-10942, U.S. application Ser. No. 771,397 and to report only those pathways determined "passable to AGVs" to a central data base, from which another scheduling program can draw the data necessary to move AGVs from one point to another in the system without attempting to place two AGVs in the same place simultaneously.

Important disadvantages of the prior art are: it is either limited to closed pathways, unidirectional motion, lack of external control of AGV motion, or to "static" collision avoidance (i.e., path planning as opposed to path supervision).

SUMMARY OF THE INVENTION

The invention described herein provides the means by which free-roving AGVs operate semi-autonomously; that is, the invention embodies both AGV-level (independent) and system-level (shared) control programs. These programs provide steering angle and drive speed control for a given AGV at each node in its path.

The invention is an addition to the control scheme set forward in Texas Instruments application 10942 (U.S. Ser. No. 771,397), where an external system executive coordinates the tasks of multiple, independently running, computerized control programs which include a communications controller task, a central data base, onboard vehicle controller tasks, an AGV-routing task, an AGV-scheduling task, and a visual navigation system task to provide factory-floor position information updates to free-roving mobile robot AGVs which incorporate onboard dead reckoning. In the TI systems, the AGVs travel within programmable pathways. The AGVs are omnidirectional and can rotate in place; that is, they have a zero turning radius and can move with equal control in any direction. This scheme allows the AGVs to operate in a minimum of pathway space but simultaneously to service a factory layout with maximum efficiency. Furthermore, since the path is not physically attached to the floor, and since the external control scheme can identify the individual AGVs separately, the AGVs can pass each other in any direction, with or without stopping.

The improvements offered by the TI systems create the additional control problem of requiring some means to monitor the AGVs in a continuously changing environment (to the control system, the AGV and its immediate surroundings appear to change as the AGV moves in relation to the factory). The invention provides these means by implementing a node-by-node check of an AGV's progress and position, by implementing a node-by-node verification of an AGV's path integrity (i.e., by verifying that each node, in succession, is a proper place for a given AGV), and by implementing an onboard control program which correlates measured AGV position with its position according to onboard dead reckoning. The invention's onboard control program also provides the means to process messages from the system's stationary controller, which ensures that the semi-autonomous AGVs are a part of a closed-loop control system (each AGV reacts only to messages intended for itself, not another AGV).

Terms Used in Describing the Invention

The invention works as part of an overall control scheme which defines the allowable travel path for an AGV as a series of path segments through or between possible destination points (called nodes) which are defined for the factory floor. AGVs can move to or through any of these nodes and can arrive in a predetermined order, according to "rules" of travel applied by a routing program (described fully in application TI#11104, co-pending).

The invention represents the low-level components of such a system:
the invention checks to see whether an AGV has reached its destination;
the invention checks to see whether additional nodes are available to the AGV;
the invention determines the angle and speed of the AGV for movement to the next node;
the invention communicates (to the AGV) the need to move to another node;
the invention allocates nodes to a specific AGV;
the invention frees or "de-allocates" nodes from a specific AGV;
the invention scans the system communication link seeking messages meant for a specific AGV;
the invention reads the AGV's positioning from the on-board dead-reckoning system;
the invention updates an AGV's position using data from a visual navigation system;
the invention notifies the system controller that an AGV movement command is completed and updates the system controller's AGV position record.

The following descriptions of the invention incorporate several key terms including: factory map, nodes, path, path segments, memory, window, and AGV.

The physical operating environment of the invention is assumed to be a factory. An AGV is an automatically guided vehicle. When the AGV control system is installed in the factory, the system operators select an arbitrary physical marker as the "factory origin." Using measuring tapes or surveyor's equipment, the location of each machine, each node, and each external visual navigation system television camera is determined and then entered into the external system computer data base as a "factory map." The factory map and its information about the location of the nodes is stored in a central computer data base accessible to each of the independently operating control programs, of which the invention is one. A node is a specific location (in factory-floor coordinates) in the factory. Factory-floor coordinates are positions in Cartesian coordinates, using the factory origin as the point (0,0).

A node is defined for each machine to be serviced, for each place in the factory where an AGV may need to be parked (servicing areas, battery-charging stations, and the like), and for any point in the factory where AGVs routinely may be required to turn or rotate. When a node is defined, it also is identified with the external visual navigation system camera which can "see" it.

Path segments connect nodes in pairs. For example, a path segment consists of a starting node, an ending node, and all the "empty" (i.e., unassigned) space in between. Rather than directing an AGV to travel from one node to another, the external system controller "reserves" for the AGV the path segments which connect the two nodes. It does this by using rule-assembling routines to transform the node list from a central, shared data base into a group of rule-defined path segments, then storing those segments in an area of the data base called the final path table.

Physical control is afforded by a combination of an independently operating visual navigation system, which periodically reports the locations of the AGVs as they move among the nodes, and multiple (one for each AGV) independently operating onboard control programs which incorporate dead-reckoning software. The position updates are recorded in an area of the control computer's memory and also are sent to the appropriate AGV's onboard controller memory. The absolute position data for the dead-reckoning software is generated by the steering and drive mechanisms in the AGVs and is compared to the AGV positions reported by the visual navigation system.

The effectiveness of this integrated scheme is based on the system's ability to "model" the factory environment and AGV population in computer memory. This technique allows the AGV controllers and the central control system to determine at any specific time the location of each AGV. This provides static collision avoidance. That is, the programs can prevent collisions by directing the AGVs only to known "safe" positions, the nodes which have been determined by the system's rules to be free of obstacles or other AGVs.

Both dynamic and static control are necessary because the various control programs in the stationary and mobile controllers can be considered "intelligent." In this case, "intelligent" means that the control programs are capable of simultaneous and independent operation, as well as dynamic determination of, and reaction to, various operating parameters. The operating system for the system executive is a real-time, multitasking program. These characteristics allow the various parts of the control system to act independently. The central data base concept adds the capability for the independent tasks to access information from other tasks. the effect is to maximize both control (through the hierarchy) and autonomy. Therefore, each independent task must be capable of controlling itself and of interacting with the distributed control system autonomously.

DESCRIPTION OF THE PREFERRED EMBODIMENT

In the TI systems, an AGV can move from one point to any other point in more than one way. As many as six AGVs may be operating independently and simultaneously in the same area. Furthermore, although specific paths are defined (and reserved) for the AGVs, the AGVs may at times wander off-path and collide with obstructions. These characteristics make it imperative to have some means of continuously monitoring AGV location. When the AGVs move along a path, a certain amount of deviation from the path occurs. The TI systems described in the related applications comprehend and control this deviation. The control systems relate AGVs to a "factory map" which can be thought of as a list of nodes. This method of control requires two independent mechanisms:

a system-level control program which can communicate with any or all AGVs in a given area of the factory;

an AGV-level control program which operates within a single AGV.

These control programs must be able to communicate not only with each other, but also with system fail-safe programs.

A separate, independent software task (described in application, TI #12757, co-pending) monitors the motions of each AGV in the system and determines where (in factory coordinates) each AGV is located. That task is a visual navigation system which incorporates:

downward-aimed television cameras to monitor beacons on the AGVs, an image-processing system to extract factory coordinates from the images of the beacons, a communications subsystem to transmit periodic position updates to the AGVs in the system.

Figure 1:
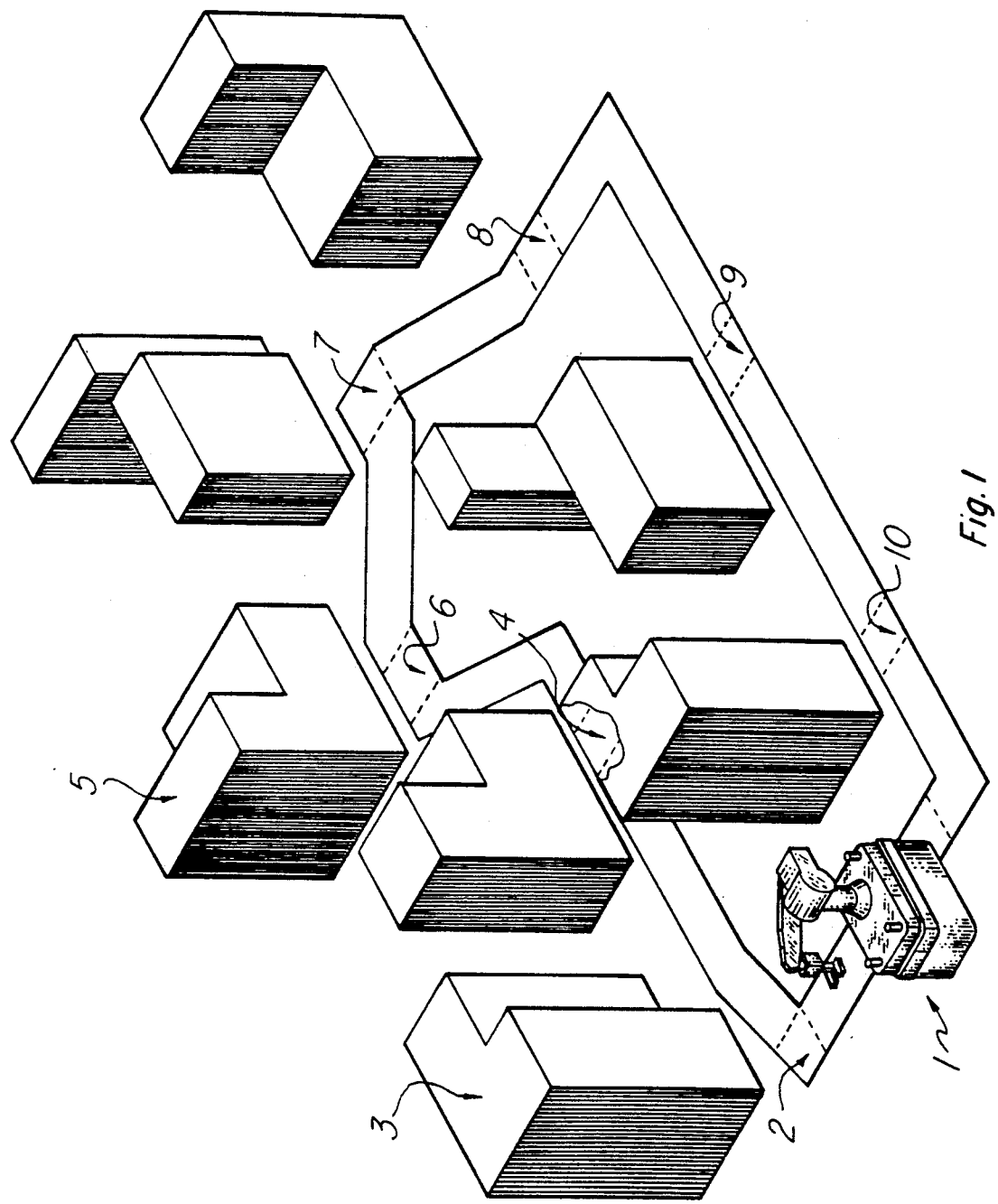
FIG. 1 is a drawing which shows a typical embodiment of the invention: a robot mounted on an AGV operating in a "factory" which consists of several separate machines and, between the machines, a network of nodes connected by path segments.
Figure 2A:
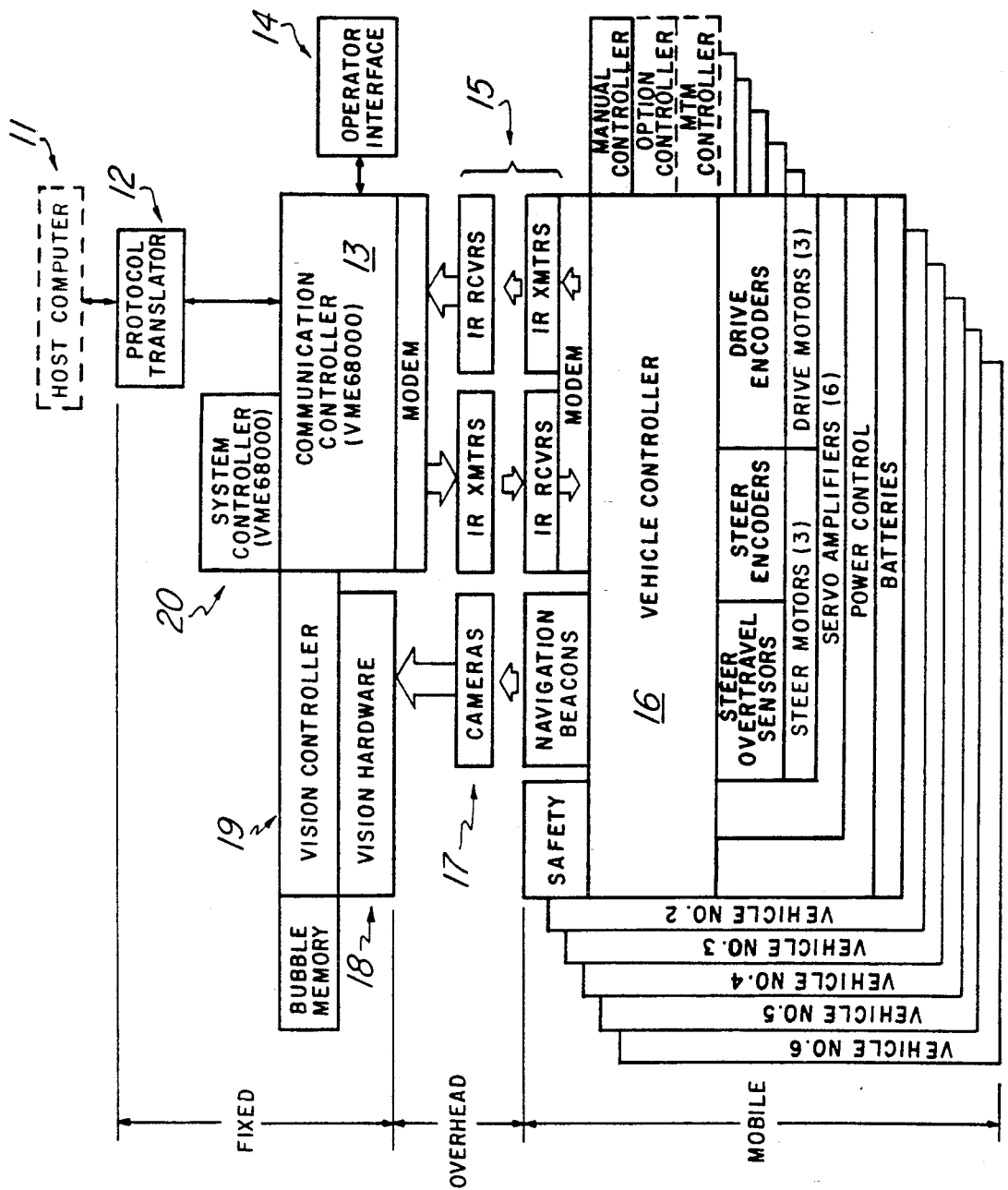
FIG. 2 is a drawing which shows the computer hardware and software necessary to control such a system as is shown in FIG. 1.
Figure 2B:
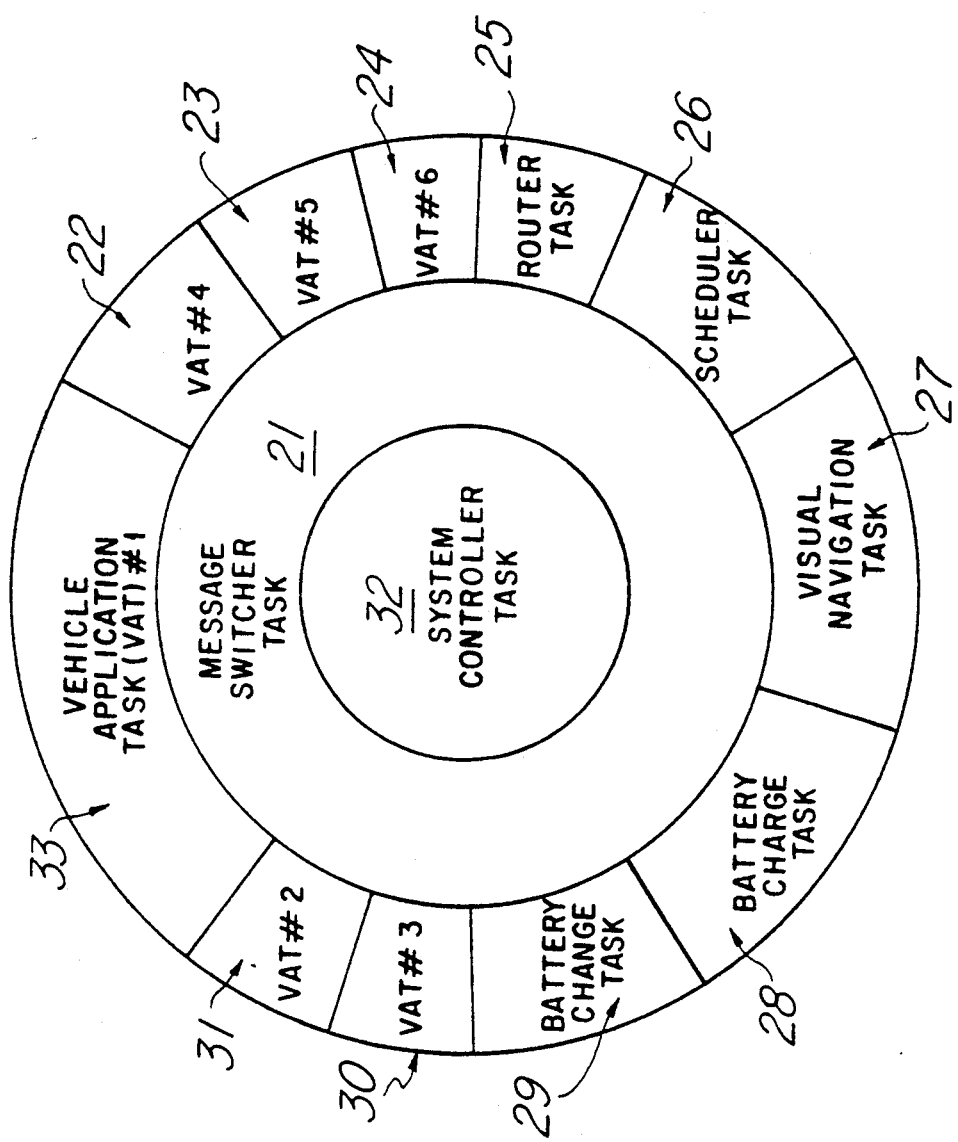

FIG. 1 shows a typical embodiment, where a mobile robot AGV (1) is free to move among machines such as 3 and 5 by travelling from one node such as 2 through another such as 4 and stopping at another such as 6. The AGV and its stationary control computer includes mechanical, electromechanical, and electronic hardware such as that shown in FIG. 2 as items 11 through 20. This hardware is controlled by a system of computer programs, represented in FIG. 2 as items 21 through 33. Each of the programs shown in FIG. 2 is an independently executing task which comprises its own set of specific routines. Tasks 22 through 24 and 30, 31, and 33 are identical, each of them reserved for a different AGV in the system. The hardware for an AGV is represented by item 16 in FIG. 1. There is one copy of item 16 for each AGV in the system. Referring now to the software in FIG. 2, some programs reside in stationary system components and some programs reside in AGVs. For example, vehicle application task #1, shown in FIG. 2 as 33, runs continuously in the vehicle controller shown as 16. Program 33 acts to control the steering and drive servo systems and motors for vehicle number 1 and also controls such non-servo functions as safety interlocks, navigation beacons, a communications modem, and certain optional items (e.g., material transfer mechanisms, called MTMs).

Returning now to FIG. 1, a typical sequence of operations would be a system-level command to move AGV 1 from machine 3 at node 2 to machine 5 at node 6. (In practice, there would be many intervening nodes, but these are omitted from FIG. 1 and this discussion to avoid unnecessary duplication of description.) In response to a command issued by a human operator or a signal from an automated machine (3) such as a metal milling machine, the system controller task (FIG. 2, 32) running in a computer in the fixed (stationary) base station would cause a message to be sent to the AGV 1 via the message switcher task (FIG. 2, 21), also running in the fixed (stationary) base station. The message would include a coded AGV identifier so that only the appropriate AGV would respond to the message. This provides an element of safety and precision operation in multiple-AGV systems. The message is transmitted by a stationary, wireless, infrared communications system. The message is received by a similar infrared system aboard the AGV, and is passed to the AGV's vehicle controller computer. The continuously running vehicle application task (FIG. 2, 33, for example) interprets the message and takes appropriate action as set forth in the discussion of FIG. 5, below. As noted in the discussion of FIG. 5, the vehicle application task must determine a proper trajectory to reach the "next node."

Returning now to FIG. 1, the AGV can be routed next either to node 4 or to node 10. An AGV routing task and scheduling task running continuously in the system controller computer in the fixed base station determines (as set forth in application TI#11104, co-pending) which node is more appropriate. In brief, this determination depends upon whether either of the nodes is reserved for use by another AGV, whether passage through one node would create a shorter overall travel time for the AGV, or both. In any case, once the determination is made the AGV's vehicle application task (33 in FIG. 2) running in the onboard vehicle controller computer (16 in FIG. 2) computes the proper trajectory. The router task running in the fixed base station system controller 20 builds a path segment between nodes 2 and 4 and issues a move command to the AGV 1. This sequence of events is outlined in FIG. 3 and detailed in the discussion of FIG. 3, described as How the Invention Routes an AGV from One Point to Another.

Once again, the vehicle application task acts to interpret the command and to set the AGV in motion toward node 4. Since the onboard AGV control program runs continuously, the AGV's position and trajectory continually are updated. As the AGV moves along the path segment, the external stationary visual navigation task (which runs in the vision controller computer (FIG. 1, 19) monitors the AGV's progress and periodically provides measured position and orientation updates via the message switcher task 21 which runs in the communications controller computer 13, as set forward in application TI#12757, co-pending.

Thus, the AGV moves from node 2 to node 4 under closed-loop, servo-like control. When the AGV reaches node 4, the onboard AGV controller task obtains data for the next path segment (node 4 to node 6) from the data base for this AGV (the node list). As for the first path segment, the various control tasks in the fixed base station and the mobile AGV coordinate the AGV's motion. Upon arrival at node 6, the system-level AGV control task outlined in FIG. 4, and detailed in the discussion of FIG. 4 (described as How the Invention Communicates between Stationary and Mobile Programs), acts to initiate such support options (FIG. 4, 403) as necessary to satisfy the demands of the specific application. These demands could be commands to use an onboard robot manipulator to move a load from the AGV to the machine (5), or such other material transfer as may be programmed into the application as a support option or options.

Program Overview

The invention's onboard AGV-level control program executes the computations necessary to keep the AGV on a path between two nodes. Essentially, the invention's stationary system-level control programs build a "node list," or sequence of nodes, through which a given AGV must pass en route from some point A to some other point B. The AGV-level routine begins processing "move" commands at point A and continues to do so for a series of move intervals, as long as necessary until:

the AGV is commanded to do something else, or
the AGV reaches point B.

From the viewpoint of the AGV controller, the AGV is always either idle or moving from the "oldest" point in a first-in, first-out (FIFO) buffer (where the node list is stored) to the "next oldest" point in that same buffer. Thus, it is possible to have many such lists, one for each AGV in the system, in order to control several AGVs "simultaneously."

This section discusses the invention in three parts:

How the Invention Routes an AGV from One Point to Another, or the interaction between the stationary router program, which resides in the system's base station, and the onboard AGV-level control program;

How the Invention Communicates between Stationary and Mobile programs, or the interaction between the stationary router program, the stationary communications controller task, the stationary system-level executive task, and the mobile, onboard, AGV-level controller task;

How the Invention Moves an AGV, or the interaction between the onboard AGV-level control program(s) and the AGV's steering, driving, and braking systems.

How the Invention Routes an AGV from One Point to Another

Figure 3:
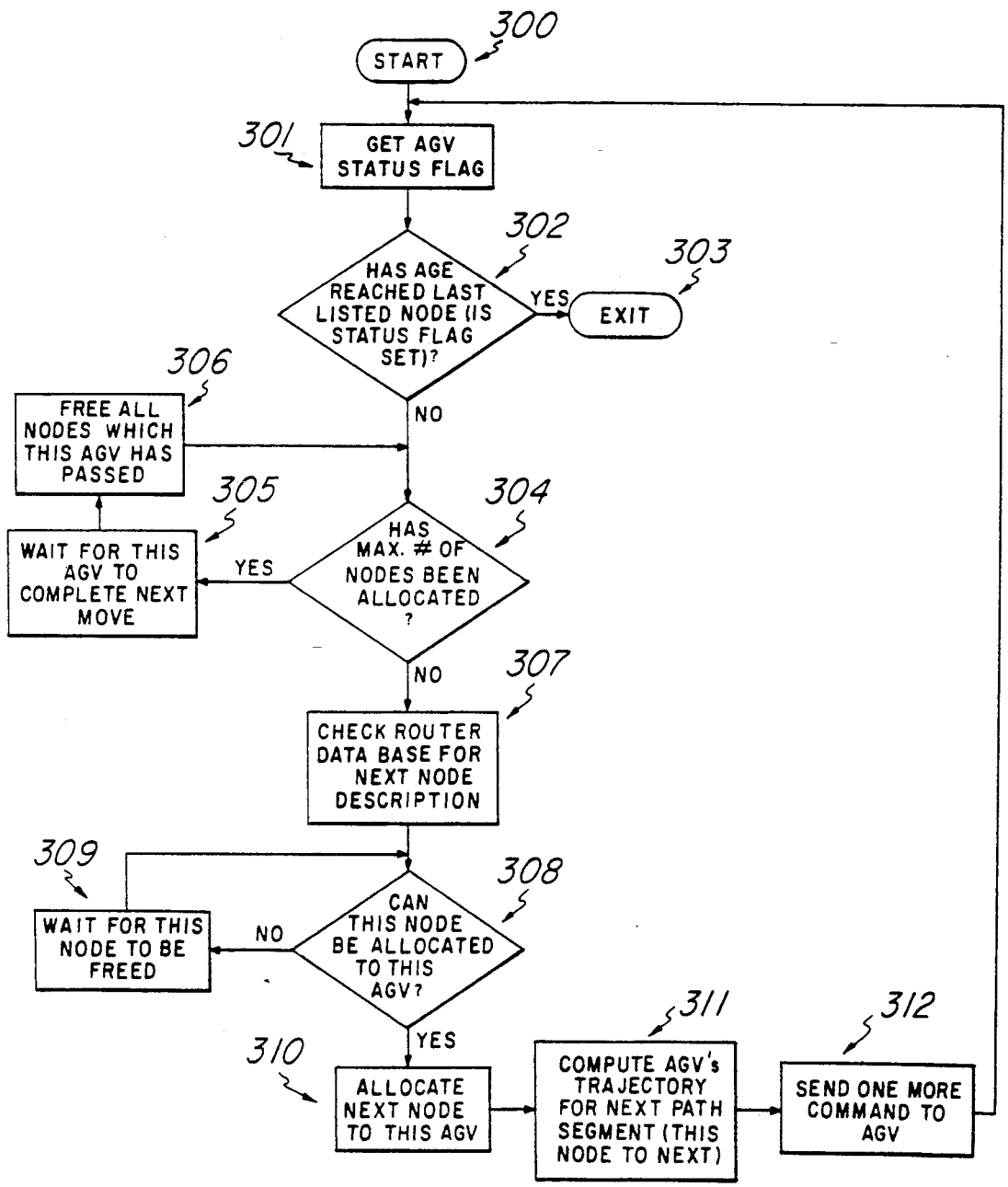
FIG. 3 is a flowchart which shows the operation of the system-level (stationary) AGV route control program for the system shown in FIG. 1 and FIG. 2.

Turning now to FIG. 3, the stationary router program which resides in the system base station must first determine whether the AGV in question has reached a node or is between two nodes. The onboard AGV controller program (shown in FIG. 5 which will be discussed later) uses an AGV status flag (FIG. 5, step 810) to indicate whether an AGV has reached its destination. The router program checks the status of this flag at step 301. At step 302 the router program exits at 303 if the AGV has reached its destination. Otherwise, the program continues to step 304. At this point, the router program checks its data base to determine whether there is room to add another node to the AGV's node list. If not (step 304, Yes), the router program waits for the AGV to reach a node so it can clear the AGV's node list of all previously completed path segments at step 306. Once there is room to add a node to the list, a No at step 304 passes control to a routine which checks the router's data base for the description of the next node in the AGV's path segment.

At this point, there are two possibilities:

the node is allocated to another AGV, in which case a No at step 308 causes the router to wait until the other AGV's router program passes the node, thereby clearing the node from its node list and freeing it for the AGV in question;

the node is free to be allocated to this AGV, in which case a Yes at step 308 passes control to step 310.

The router program allocates a free node to the AGV at step 310. Next, the router program computes the AGV's trajectory at step 311 to determine the node assignment for the next node. Depending upon the factory's size, the complexity of the paths allowed among the nodes, and the number of AGVs in the system, this computation can be simple or complex. The precise method of this computation is set forward in application TI#11104, co-pending, and therefore need not be discussed here.

Once the next node to be allocated is determined by the router program and the referenced routine, the desired trajectory is known and the router program issues a move command to the AGV (at step 312). This command takes the form of a message via the external communications controller task to the external system controller task (both in the system base station) and thence through the communications controller and IR communications systems to the AGV-level controller task onboard the AGV. It is important to note that the message includes an identification code which ties the message to a particular AGV.

How the Invention Communicates between Stationary and Mobile Programs

As has been noted earlier, communication between stationary and mobile parts of the AGV system computer programs takes place in the form of coded messages. These messages include an AGV identifier to ensure that a message gets to the proper AGV. There is one and only one identifier for each AGV and no two AGVs have the same identifier. And, since it sometimes is necessary to convey a message to all AGVs simultaneously, a separate identifier in a message causes all active AGVs in the system to interpret the message.

Figure 4:
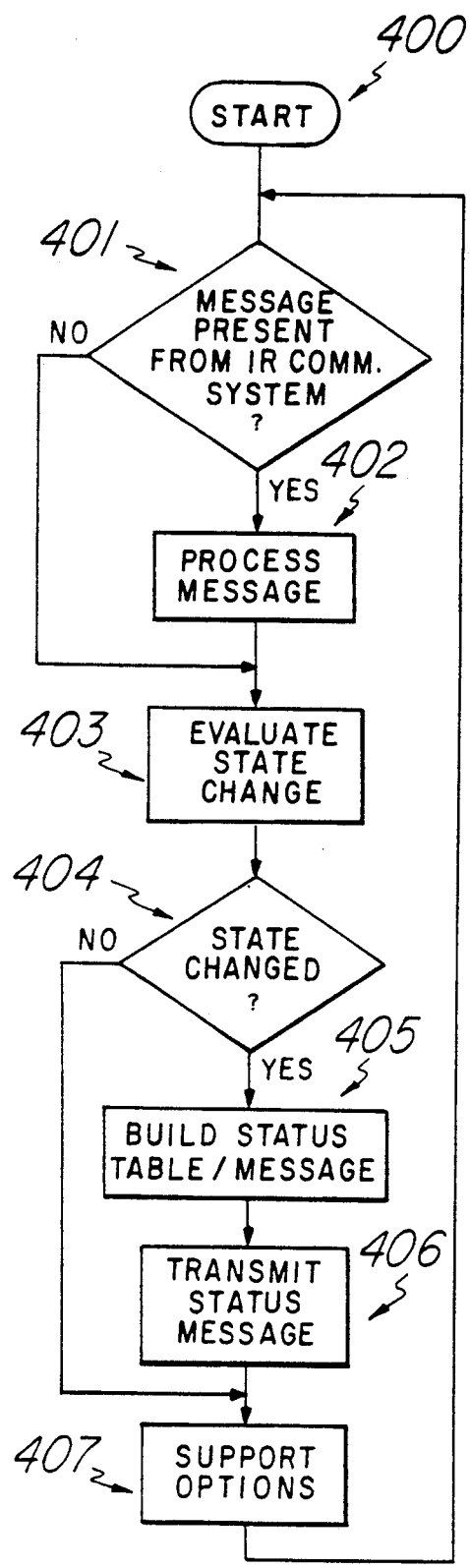
FIG. 4 is a flowchart which shows how the stationary system-level executive program for the system shown in FIG. 1 and FIG. 2 interacts with mobile AGV-level control programs via the wireless infrared communication system and the system-level message switcher (communication controller).

Messages may be sent continuously from the stationary system controller to any or all AGVs in the system. FIG. 4 illustrates how the invention bridges the gap between the stationary tasks and the mobile tasks. Note, however, that the hierarchical and modular nature of the tasks allows many copies (one for each AGV in the system) of the tasks to operate simultaneously and independently while the stationary system controller retains the ability to control any or all tasks as necessary. The method by which the mobile portion of the system-level AGV control program aboard a specific AGV communicates with other parts of the system is a primary part of the invention. Essentially, system-level control tasks loop continually in the stationary controller while other AGV-level control tasks loop continually in the vehicle controller aboard the AGV.

Turning now to FIG. 4, which represents part of the mobile, system-level AGV controller task, the continuously-running program begins by checking at step 401 for the presence of a message intended for this particular AGV and originating in some other part of the system (such as the stationary router/scheduler task).

If no message is present, control passes to step 403, which is a routine which checks the status table built during the previous pass through the control loop. The routine checks such things as whether the AGV has arrived at a node, has left a node, has failed, has a low battery charge state, has been stopped by a panic stop button, has bumped into something, and the like. Any such condition is signalled by a change in state of a particular status bit in the status table. The routine at 403 checks the table for such changes and passes control to 404. In the case where no status bit have changed, control passes directly to the support options status check at 407, which is described later. If, however, there has been a change of state, the routine at 405 builds a new status message to be transmitted to the stationary system controller via the message controller task by the routine at step 406. This message is the mobile-to-stationary link in the invention's control scheme. Routines in other parts of the system check the status bits which appear in the message and thereby are alerted to the AGV's current condition. In typical embodiments to date, status checking runs continuously and communicating takes place as needed, typically many times per second per AGV. Thus, to a human observer, the AGVs appear to operate completely independently, yet they also can respondly quickly to commands issued by an operator at the operator interface terminal of the stationary system controller.

It is important to note that the invention provides capabilities for processing two completely different types of commands:
   commands involving AGV servo control (wheel motion, steering, and the like)
   commands involving material handling equipment aboard the AGV and other non-servo actions (support options like load presence, robot arm applications, and the like).

This command differentiation provides the ability to cycle simpler functions such as material transfer mechanism status checking very rapidly (by human standards, continually), while retaining the ability to give priority to motion-control tasks.

Returning now to the discussion of FIG. 4, the preceding discussion detailed the operation of the invention in response to status changes which affected AGV servo control. The following example illustrates how the invention operates in response to status changes which do not directly affect AGV servo control. The example case is that of an AGV in motion from one node to another while carrying a load meant for a specific node (e.g., a particular machine). Normally, the previous pass through the loop from step 401 through 405 would indicate the AGV's status as normal, including at least one status bit reserved for indicating the presence of a load aboard the AGV's material transfer mechanism (MTM). For example, a microswitch positioned in a load bay may be depressed (closed) by the weight of a load, indicating the need to set the particular status bit associated with that load bay. As long as the load remained seated in the bay, successive passes through the loop would not include status changes in the MTM support option. If, however, a person were to remove the load (or the load were to fall off the AGV while the AGV is in transit between nodes, the MTM status bit would change. Referring now to FIG. 4, control for the previous loops from 401 to 407 in the example cited has been in the sequence 401, 403, 404, 407, and back to 401, continuously (assuming there have been no messages to the AGV). However, if the load is removed while the AGV is in transit (a situation not in compliance with normal operation) then the status check of support options at 407 would indicate a change in the MTM load bay bit. Accordingly, on the next pass through the loop the routine at 403 would detect the change and pass the change on through 404, 405, and thence to the stationary system controller via the message transmitted at step 406. This example points out the operation of the support option status checking routine. Any number of options may be checked. What is important to note is that the invention provides the means to check both AGV motion-control parameter status and "support options" which need not directly involve the AGV's operation. The point of this example is simply to show the flexibility the invention affords while retaining other essential attributes of a closed-loop, servo-like control method.

How the Invention Moves an AGV

The primary task of the invention is to control the movement of the AGV. This is accomplished by interpreting messages to the AGV as move commands. The router program outlined in FIG. 3 and described earlier generates the move commands. The move commands are passed through the stationary communications controller task as described above to the stationary system-level AGV controller task and thence through the IR communications system to the appropriate mobile, onboard, system-level AGV control task as described in the preceding section.

Figure 5:
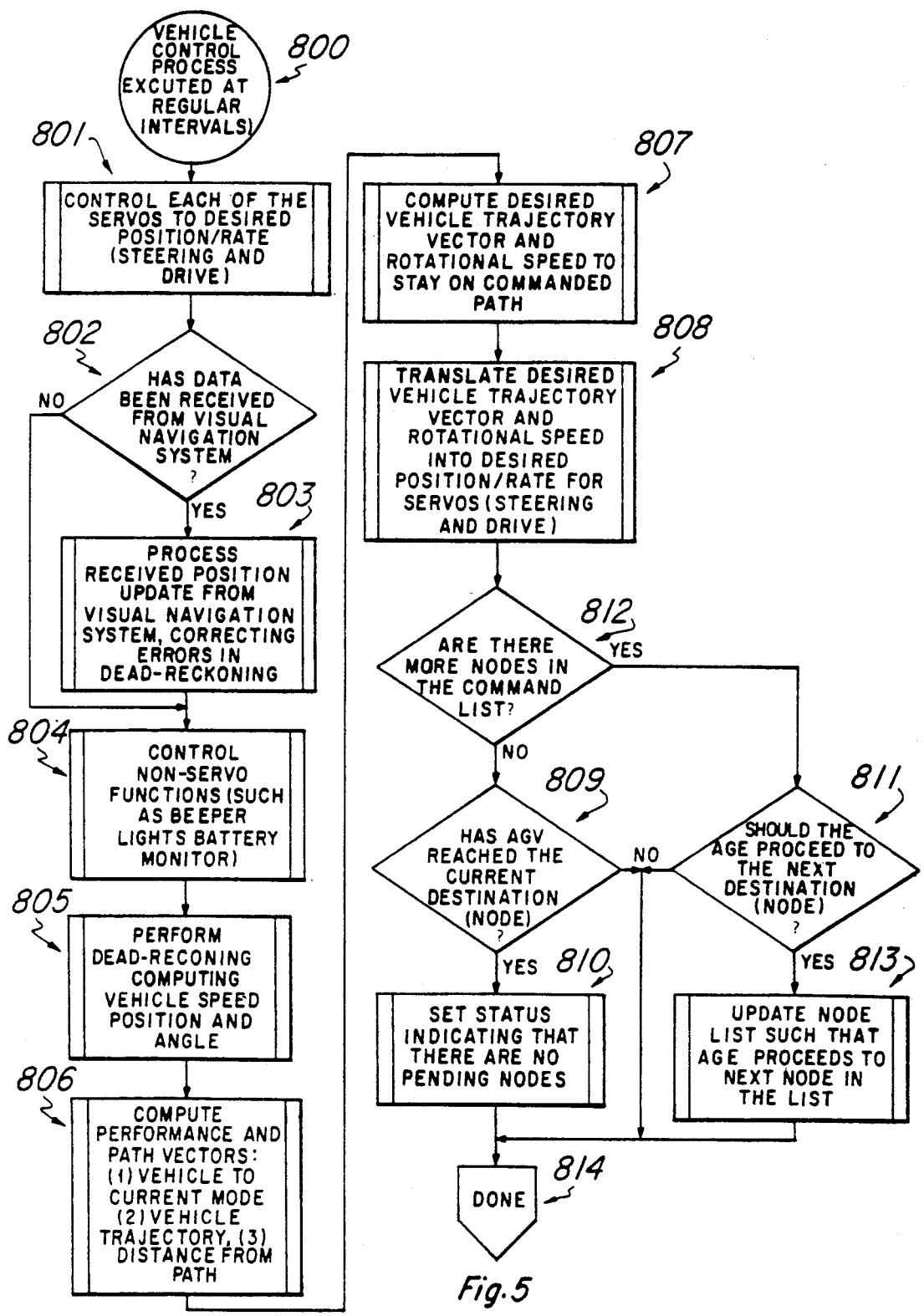
FIG. 5 is a flowchart which shows the AGV-level control process.

Turning now to FIG. 5, it is important to note as at 800 that the onboard AGV control program is a process that executes at regular intervals. In the current embodiment, AGV-level control is given by processing interrupts. In effect, the AGV-level control program is run against a timer (the interval between interrupts). This allows the AGV a certain amount of autonomy. For example, at step 801 the AGV control program directs each of the AGV's servo systems to the desired position and rate to effect AGV steering and drive. The desired position and rate are given by the previous pass through the first half of the AGV control loop (through step 808). The second half of the control loop, from step 809 through step 813, determines the AGV's state at the exit of the control loop (814), depending upon whether the AGV has reached a node in the current pass through the loop.

External input, as at step 802, provides system-level control in response to monitoring by an external (to the AGV) visual navigation system. As explained in application TI#12757, co-pending, this visual navigation system consists of a network of cameras suspended from the factory ceiling and aimed downward, overlooking the AGVs, nodes, and machines to be serviced. Since this navigation system is capable of measuring the position of any of the AGVs at any time they are in view of a camera, the camera network, image processing system, and visual navigation software provide the means to locate a particular AGV. The AGV control program uses information from the visual navigation system to determine whether there is a need to correct the AGV's position as given by an onboard dead-reckoning calculation. As at step 802, at each pass through the onboard control loop the program checks for the presence of a message from the visual navigation system via the external communication controller (FIG. 2, 16) and system controller (FIG. 2, 20). The external system controller is detailed in application TI#11112, co-pending). If such a message is present, it can only be meant for this particular AGV, as explained earlier in the discussion leading up to FIG. 4, step 401. The onboard AGV control program processes the message to extract the AGV's measured position, as at step 803, and compares the measured position with the position given by the onboard dead-reckoning calculator, correcting as necessary. If no message from the visual navigation system is present, the onboard AGV control program bypasses step 803 and goes directly to step 804.

At step 804 the onboard control program acts to control certain non-servo functions which require action at the AGV. For example, the external visual navigation system may require a particular AGV to display a certain pattern with its navigation beacons. If this is the case, that AGV's light pattern will be stored in registers and activated each time the control loop reaches step 804. Various other non-servo functions also may be required at this step from time to time.

Step 805 represents the start of the AGV guidance process. At step 805 the program calculates the AGV's position, speed, and angle by dead-reckoning. At step 806 the program computes:

the parameters of the AGV's position relative to the current node (that given at the top of the node list), the AGV's trajectory, the AGV's distance from the desired path (as explained in application TI#12727, co-pending).

The results from steps 805 and 806 are used by a routine represented here as step 807 to determine the "mid-course correction" needed to keep the AGV on its intended path. Essentially, the routine at 807 determines the difference between where the AGV "thinks it is located" and where the system "has told it to be." The routine determines the "best" trajectory to keep the AGV on its intended path. Thus, step 808 calculates the inputs to the position and rate servos to move the AGV.

As shown in FIG. 5 step 812, the AGV control program must next determine whether to continue moving the AGV on its current course at its current speed. If other nodes are in the node list, the AGV most likely should continue (Yes, at step 812); otherwise, the control program must check to see whether the AGV has reached a node (step 809). In the case where the AGV is to continue, the control program checks at step 811 to determine whether to get the next node description from the node list. A Yes at step 811 leads the control program to fetch the next node description and exit the current control loop at 814. The parameters from the node list are thus passed through the loop so that the next loop iteration has the necessary information at step 801 to set the desired steering and drive controls.

However, if at step 812 the control program determines there are no more nodes in the AGV's node list, the control program must then determine at step 809 whether the AGV has reached the current node. This determination is made by comparing the AGV's dead-reckoned position with the position of the node as given in the node list. If the two positions match (Yes at step 809), then the control program sets a status flag at step 810 to alert the system controller that the AGV has reached its destination. The third possibility is that even though no more nodes remain in the AGV's node list (No, at step 812) the AGV has not yet reached its destination (No, at step 809), which is the current node. In such a case, the control program takes no action (it leaves the current node description and AGV trajectory data in place) other than to exit the current iteration of the control loop at step 814. This has the effect of passing the current data back into the next iteration of the loop for processing at step 801.

Summary of the Invention's Operation

As described in the preceding sections, the invention is embodied in three separate control loops:

a router program which corresponds to a particular AGV a system-level, onboard AGV controller task which is running in a computer aboard a particular AGV and which responds to messages intended for that AGV alone an AGV-level, onboard AGV controller task which controls the hardware aboard that AGV to cause the AGV to move, to stop, and to service other support options on that AGV alone These control loops run continuously. They are independent, but each includes a communications checkpoint to provide a means of control by the external system executive.

It is important to note again that the external system executive operates in a multitasking operating system. This makes it possible to run many copies of the invention simultaneously and independently. In actual implementations to date, as many as six copies of the invention run simultaneously per system. The hierarchical organization of these tasks makes possible the maximum AGV autonomy for a given level of system executive control.

We claim:

1. A method of routing an AGV along one of a plurality of predefined paths, in which a system controller communicates with a plurality of AGV controllers, there being an AGV controller for each AGV being controlled; comprising:
    (a) defining a plurality of alternate paths, each of which comprises a beginning node and an ending node with a plurality of nodes in-between;
    (b) selecting one of said paths;
    (c) controlling the movement of an AGV by an AGV controller and moving the AGV from node to node along said selected path and defining the time said AGV will occupy each node of said selected path;
    (d) allocating the nodes along the selected path to said AGV;
    (e) determining contested nodes of said selected path which also are allocated to another AGV;
    (f) directing said AGV to travel from node-to-node along said selected path, stopping the AGV at the node just prior to any encountered contested node.

2. The method of claim 1, further comprising:
    (g) holding said AGV at said prior node until it is determined that said encountered contested node is no longer allocated to said another AGV.

3. The method of claim 1, further comprising the step of:
    de-allocating said passed nodes to said AGV after nodes have been passed by said AGV.

4. The method according to claim 2, further comprising the steps of:
    repeating the steps (f) through (g) until said AGV reaches said ending node.

5. The method of claim 4, further comprising:
    carrying out said steps on the AGV controller in conjunction with said system controller.

6. A system for routing AGVs along one of a plurality of predefined paths, in which a system controller communicates with a plurality of AGV controllers, there being an AGV controller for each AGV being controlled, comprising:

a plurality of predefined paths, each of which comprises a beginning node and an ending node with a plurality of nodes in-between, said in-between nodes common to more than one predefined path;

a system controller for:
(1) selecting one of said paths;
(2) scheduling the times said AGV will occupy the nodes of said selected path;
(3) for allocating said scheduled nodes to said AGV;
(4) determining contested nodes of said selected path which are allocated to another AGV; and an AGV controller for directing said AGV to travel from node-to-node along said selected path, stopping at the node just prior to any encountered contested node, in response to communications from said system controller.

7. The system of claim 6, further comprising:
a means for holding said AGVs at said prior node until it is determined that said encountered contested node is no longer allocated to said other AGV.

8. The system of claim 6, further comprising:
means for de-allocating passed nodes to said AGV after said passed nodes have been passed by said AGV.

9. The system of claim 6, further comprising:
a communication system linking said nodes to said system controller.

10. The system of claim 9, further comprising:
a vehicle controller computer on-board each AGV for receiving commands from said system controller via said communication system.

* * * * *